METHOD FOR REMOVING MICROSCOPIC DUST PARTICLES

Filed April 28, 1965

INVENTORS.
ROY A. APPLEQUIST
RUSSELL K. BRUNNER
ROBERT E. PATTISON

BY Homer L. Knearl AGENT

United States Patent Office 3,366,390

Patented Jan. 30, 1968

3,366,390

METHOD FOR REMOVING MICROSCOPIC DUST PARTICLES

Roy A. Applequist, Russell K. Brunner, and Robert E. Pattison, San Jose, Calif., assignors to International Business Machines Corporation, Armonk, N.Y., a corporation of New York Filed Apr. 28, 1965, Ser. No. 451,597

1 Claim. (Cl. 274—47)

ABSTRACT OF THE DISCLOSURE

An apparatus for removing particles from high speed magnetic recording members in which wear on both the magnetic surface and the particle removing apparatus is minimal. Means (fibers) are provided for lightly contacting the magnetic surface to dislodge the particles, without sweeping them off. Further, means is provided to carry off the dislodged particles, by viscous drag, or centrifugal force, etc.

This invention relates to apparatus for removing particles from high speed magnetic memories and more particularly to apparatus for removing particles from a magnetic disk file to prevent scratching of the magnetic surfaces of the disks. While the invention is described with regard to disk files, it has applicability to any magnetic memory file such as strip files.

Data processing equipment often utilizes magnetic disk files which are interchangeable on a machine used to read information into or out of the disk files. These interchangeable disk files are commonly referred to as disk packs. An operator selects a disk pack and positions it on the disk file drive. The disk pack normally consists of a plurality of disks spaced axially along a common shaft with each disk storing information magnetically on both of its sides. During read-in or read-out, the disk pack rotates at high r.p.m. and a plurality of read heads move into the disk pack. The read heads are positioned about 125 micro inches (.000125″) above the surfaces of the disks. If any particles have accumulated on the disks during idle time or when the disks are being interchanged, these particles may be caught between a read head and a disk surface and scratch the surface. Scratches on the magnetic surface of a disk will obliterate recorded information and may eventually cause destruction of the surface's ability to store information.

Since particles adhere to the disk surfaces as a result of molecular attraction, magnetic attraction, grease spots, etc., removal of the particles has created a difficult problem. With the disks rotating a minimum of 1500 r.p.m., a head-to-disk spacing of 125 micro inches, and high recording densities of 100 tracks per inch and in excess of 1000 bits per inch, even microscopic particles can cause severe damage to the disk surfaces. At these high recording densities, even microscopic particles will produce scratches, the width of which may equal or exceed the track width, thus making it impossible to retrieve previously recorded data in the presence of such a scratch. Various means, including sweeping and blowing, have been investigated in order to remove the particles from the disk. Both of these methods leave a residue of small particles on the disk and the sweeping causes destructive wear of both the disk surface and the bristles of the sweeping element due to friction. Prior to the advent of the present invention, the only effective means of removing all particles has been to swab the disk surfaces with alcohol or similar cleaning agent. However, swabbing each disk surface every time the disk pack is mounted on the disk drive is completely impractical from an economic and manpower standpoint.

It is an object of the present invention to provide a practical means for removing substantially all particles from the magnetic surface of a high speed magnetic memory while minimizing wear on both the magnetic surface and the particle removing means.

In accordance with our invention, the above object is accomplished by provision of means for dislodging the particles and by use of a separate carrying force to carry off the dislodged particles. Soft, flexible fibers are mounted in a comb or brush which is lightly moved across the surfaces of the disks after the disk file has been brought up to its operating speed. The fibers do not sweep the particles off the disks but, rather, merely dislodge the particles from adherence to the disks, so that they may be carried off by centrifugal force, viscous drag, etc. The fibers are so lightly loaded as to merely tickle the surfaces of the disks. As a result, the wear on both the fibers and the disk surfaces is negligible and the friction between the fibers and the surfaces is low enough to prevent overheating and subsequent melting of the fibers. Thus, by dislodging particles from the surfaces of the disks and using a carrying force large supplied by the motion of the disks themselves, the disk surfaces can be kept scratch free, thereby permitting the high storage densities required in modern disk files and materially increasing the useful life of the disks.

The foregoing and other objects, features, and advantages of our invention will be apparent from the following more particular description of the preferred embodiment of our invention, as illustrated in the accompanying drawings.

Figures 1, 2, 3:
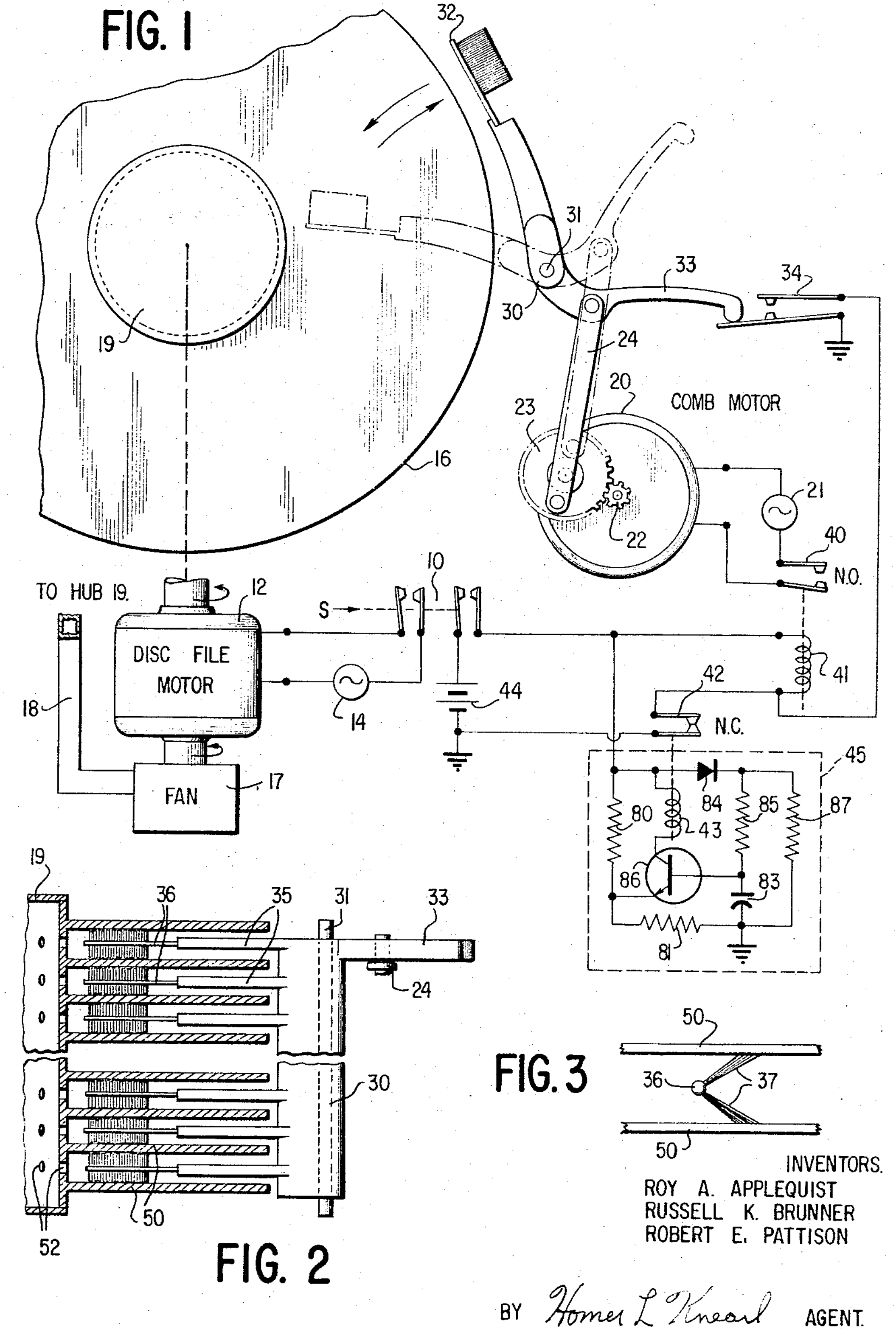
FIG. 1 is a top projection view of the preferred embodiment which uses soft flexible fibers to dislodge the particles.
FIG. 2 is a rear projection view of the fibers and their mounting comb and also a rear sectional view of the disk pack.
FIG. 3 is a side projection view showing the relation between the fibers and the surfaces of the disks.

In order to better understand the invention, reference is now made to the structure of FIG. 1. Double pole switch 10 acts to turn the apparatus on. Disk file motor 12 supplied with alternating current from source 14 rotates the disk pack 16 at high r.p.m. Fan 17 is also driven by motor 12 to blow air through air duct 18 into hollow hub 19. Meanwhile comb motor 20 supplied by A.C. source 21 drives gears 22 and 23. Linkage 24 mounted off center on gear 23 translates a rocking motion to comb 30. Comb 30 pivots about shaft 31 so that fiber assembly 32 consisting of fibers 37 and a stem 36 (see FIGS. 2 and 3) swings into and out of the disk pack 16.

Once the disk pack has come up to speed and been cleaned off, particles will not collect upon it again until the disk pack stops rotating. Therefore, it is only necessary to swing the fiber assembly 32 into and out of the disk pack once just after the disks have been brought up to their high rotational speed. Arm 33 operates on contacts 34 to turn the comb motor 20 off after one complete cycle of comb 30 into and out of the disk pack 16. Normally open contacts 40 activated by coil 41 and normally closed contacts 42 activated by coil 43 are supplied with power from battery 44 and controlled by the control circuit 45. The control circuit insures that, first, the comb motor 20 will be on long enough to lift arm 33 off contacts 34 and, second, the comb motor 20 will be turned off when arm 33 again returns to contacts 34.

Reference is now made to FIG. 2 where the structure of the disk pack and the comb 30 is more clearly shown.

Disks 50 are mounted about a hollow hub 19. Perforations 52 in the hub direct air flow radially outward across the surfaces of the disks. Fan 17 and air duct 18 (shown in FIG. 1) force air into the hub 19 and through the perforations 52. With regard to the comb, fingers 35 carry the stems 36 between the disks 50 in the disk pack.

FIG. 3 shows a stem 36 and the fibers 37 positioned with respect to two disks 50. Fibers 37 are mounted in stem 36 so as to form an acute angle with the surface of the disk as it moves into the fibers. The disks 50 are rotating from left to right. The speed of the disk rotation is so much faster than the comb movement into and out of the disk pack that the fibers are always kept swept back. The width or sweep of the fiber assembly 32 need not be as wide as the radius of the disk because the speed of the fiber assembly into the disk pack is so slow relative to the rotational motion of the disk that the same point on a disk will move under fibers 37 several times as the fiber assembly moves into and out of the disk pack.

Fibers of nylon with a diameter of 3 mils have provided the desired softness and flexibility in the preferred embodiment. However, most any animal hair which is not too coarse can be used; some examples would be human hair, goat hair and camel hair. The force between each fiber and the surface of the disk is from 1 to 3 milligrams in the preferred embodiment. This force amounts only to a tickling pressure. Tickling pressure means a force just sufficient to insure contact between the fibers and the magnetic surface of the disk.

*Operation*

Referring now to FIG. 1, the operation of the preferred embodiment of the invention will be described. In order to start the disk file rotating, double pole switch 10 is closed. Disk file motor 12 quickly brings the disk pack 16 up to a high r.p.m., 1500 r.p.m. or greater. Simultaneously the motor 12 drives fan 17 to blow air through air duct 18 into the hub 19 of disk pack 16.

Closing double pole switch 10 also connects relay coil 41 to the battery 44 through normally closed contacts 42. Relay coil 41 then acts to close normally open contacts 40 which turns comb motor 20 on. Comb motor 20 drives gear 22 which engages and drives gear 23. Linkage 24 is mounted off center on gear 23 and acts to rock comb 30 about shaft 31 into the disk pack 16. As the comb pivots its arm 33 permits contacts 34 to close. With contacts 34 closed, current through relay coil 41 is insured so that comb motor 20 will remain on.

When contacts 34 have been mechanically closed there is no longer any need for current through normally closed contacts 42. In fact, it is desirable to open contacts 42 so that when arm 33 returns to open contacts 34 the comb motor 20 will be turned off. In this way, the comb will be limited to one movement into and out of the disk pack and thereafter be inactive until the system is turned off and on again. Therefore, the requirements on the operation of relay contacts 42 are that the contacts 42 be initially closed until contacts 34 are closed and thereafter the contacts 42 must be held open until the motor 12 is turned off.

Control of the relay contacts 42 in the above manner is accomplished by control circuit 45. When switch 10 is closed, voltage from the battery 44 is immediately divided between resistors 80 and 81. Simultaneously, capacitor 83 starts to charge up through diode 84 and resistor 85. This insures that the emitter voltage on transistor 86 will initially be higher than the base voltage. When the base voltage builds up in the capacitor to a level higher than the emitter voltage the transistor 86 will turn on and conduct current through relay coil 43. Relay coil 43 will then act to open normally closed contacts 42. Having been opened relay contacts 42 will be held open because the voltage on capacitor 83 will keep transistor 86 conducting. The time required to charge capacitor 83 up to a level where it will turn transistor 86 on, must be longer than the time required to lift arm 33 off the contacts 34. This will insure the comb motor 20 is held on by current flow through relay contacts 42 until current flow through contacts 34 is possible.

When the disk file motor 12 is turned off it is necessary to close relay contacts 42 so that the control circuit will be ready when the disk file is again activated. This is accomplished by providing resistor 87 to discharge capacitor 83 through resistors 85 and 87 when the double pole switch 10 is opened. Simultaneously, as capacitor 83 is discharging, it maintains transistor 86 conducting long enough to discharge the coil 43 through resistor 80. In summary the control circuit causes the comb 30 to move into and out of disk pack 16 once each time the disk file motor 12 is turned on.

As the comb 30 moves into the disk pack 16, the disk pack is brought up to a high angular velocity so that particles which are jarred free by fibers 37 from adherence to the surfaces of the disks will be thrown off by centrifugal force. In addition, air is blown by fan 17 through perforations 52 in hub 19 radially outward across the surface of the disks. Many particles which are jarred loose by fibers 37 can be carried off by this air flow over the disks.

Fibers 37 lightly tickle the surfaces of the disks with insufficient force to pick up the particles or sweep the particles. The particles pass under the fibers. However, the fibers do knock the particles loose from their adherence to the surfaces of the disks. Having been knocked loose the particles are then either thrown off by centrifugal force or carried off by the viscous drag force of the air flow directed radially outward across the surfaces of the disks.

The description of the invention has dealt primarily with disk files. However, it will be understood by those skilled in the art that our invention could be applied to any high speed magnetic memory file susceptible to particle damage. Any apparatus having a magnetic surface which moves at high speed through a confined passage might advantageously employ our invention to reduce wear on the magnetic surface. Two examples are the magnetic drum and magnetic tape systems used for information storage. Specifically, a magnetic-tape, strip file system could easily adapt our invention to reduce wear on the tapes.

In strip file systems, strips of tapes are assembled in face-to-face relation in an array. For read/write operations, a strip is selected and moved from its location to the read/write head. When the read/write operation is complete the strip is returned to its location. Our invention could be adapted to this system, for example, first by mounting a comb of fibers to tickle the surface of the strip, as it is being moved, so as to dislodge particles and second, by using a carrying force such as centrifugal force or viscous drag force to carry the dislodged particles of the strip.

While the invention has been particularly shown and described with reference to a preferred embodiment thereof it will be understood by those skilled in the art that the foregoing and other changes in form and details may be made therein without departing from the spirit and scope of the invention.

What is claimed is:

1. In a high speed, high density magnetic disk file—wherein the magnetic surface on a disk is micro inches thick, the read heads ride micro inches above the magnetic surface and the disk file rotates at several hundred r.p.m.—apparatus for removing substantially all the particles from the magnetic surface with minimal wear on the magnetic surface comprising:

soft, flexible fibers in contact with the magnetic surface so that particles are dislodged from adherence to the magnetic surface while passing under said fibers without adhering to said fibers, said fibers being made of nylon less than 3 mils in diameter to achieve the desired softness and flexibility and each of said fibers being applied to the magnetic surface with a force less than 3 milligrams, so that wear on the magnetic surface and said fibers is negligible;

a motor for driving the disk file at 1500 r.p.m. and greater to impart to the particles on the magnetic surface a centrifugal force to carry the particles dislodged by said fibers off the magnetic surface;

perforations in the hub of the disk file to direct a flow of air radially outward across the magnetic surface to impart to the particles on the magnetic surface a viscous drag force in addition to the centrifugal force to carry particles dislodged by said fibers off the magnetic surface;

a reciprocating arm to support said soft, flexible fibers and to swing said fibers into and out of contact with the magnetic surface; and control means responsive to the start of said motor to cause said reciprocating arm to swing said fibers into and out of contact with the magnetic surface once each time the disk file is brought up to operating speed so that wear on the magnetic surface and said fibers is minimized.

References Cited

UNITED STATES PATENTS

| | | | |
|---|---|---|---|
| 2,294,660 | 2/1942 | Hess | 274—47 |
| 2,300,923 | 4/1941 | Hornor | 274—47 |
| 2,496,076 | 7/1944 | Webb | 274—47 |
| 3,218,082 | 11/1965 | Taylor et al. | 274—47 |

FOREIGN PATENTS

| | | |
|---|---|---|
| 820,622 | 9/1959 | Great Britain. |

LEONARD FORMAN, *Primary Examiner.*

F. J. D'AMBROSIO, *Assistant Examiner.*